J. M. M. TRUFFAULT.

FRICTIONAL RETARDING MEANS FOR SPRING VEHICLES.

APPLICATION FILED FEB. 9, 1906.

Reissued Jan. 4, 1910.

13,073.

2 SHEETS—SHEET 1.

Witnesses:
Chas. R. King.
Adolph F. Dinst.

Inventor:
Jules Michel Marie Truffault
by Dunn & Finch
Attys.

J. M. M. TRUFFAULT.

FRICTIONAL RETARDING MEANS FOR SPRING VEHICLES.

APPLICATION FILED FEB. 9, 1906.

Reissued Jan. 4, 1910.

13,073.

2 SHEETS—SHEET 2.

Witnesses:
Chas. D. King.
Adolph F. Finsy

Inventor:
Jules Michel Marie Truffault by Dunn & Finch
Attys.

UNITED STATES PATENT OFFICE.

JULES MICHEL MARIE TRUFFAULT, OF PARIS, FRANCE, ASSIGNOR OF FIFTY-ONE ONE-HUNDREDTHS TO EDWARD V. HARTFORD AND FORTY-NINE ONE-HUNDREDTHS TO GEORGE H. HARTFORD, BOTH OF ORANGE, NEW JERSEY.

FRICTIONAL RETARDING MEANS FOR SPRING-VEHICLES.

13,073. Specification of Reissued Letters Patent. Reissued Jan. 4, 1910.

Original application filed September 4, 1900, Serial No. 28,956. Original No. 695,508, dated March 18, 1902. Application for reissue filed June 9, 1905, Serial No. 264,523. Divided and this application for reissue filed February 9, 1906. Serial No. 300,343. Division B.

*To all whom it may concern:*

Be it known that I, JULES MICHEL MARIE TRUFFAULT, engineer, of 51 Avenue des Ternes, in the city of Paris, Republic of France, have invented Improvements in Frictional Retarding Means for Spring-Vehicles, of which the following is a full, clear, and exact specification.

This invention relates to the class of vehicles in general wherein springs are employed to relieve jolting and vibration, and particularly motor cars and cycles of the various well-known kinds. Notwithstanding the use of springs for supporting the bodies of such vehicles much inconvenience is felt from the shocks and vibrations due to the wheels, and particularly the front steering wheel or wheels, striking obstructions in the road.

The object of the present invention is to overcome or materially modify these shocks and vibrations by combining with the spring supporting devices certain frictional devices between the moving parts or between the running-gear and the spring-supported parts, whereby said frictional devices serve as brakes to retard the too-rapid vibration or movement of the parts.

The invention may be embodied in various ways and by details of mechanism which vary, the particular construction depending to a considerable extent on the kind of vehicle to which it is applied.

This application is a division of application filed June 9, 1905, Serial No. 264,523, on which Reissue Patent No. 12,437, of January 16, 1906, was issued upon the surrender of original Patent No. 695,508, of March 18, 1902, the application for which was filed September 4, 1900.

In the accompanying drawings the invention is shown as embodied in a motor-tricycle and as applied to the front thereof.

Figure 1:
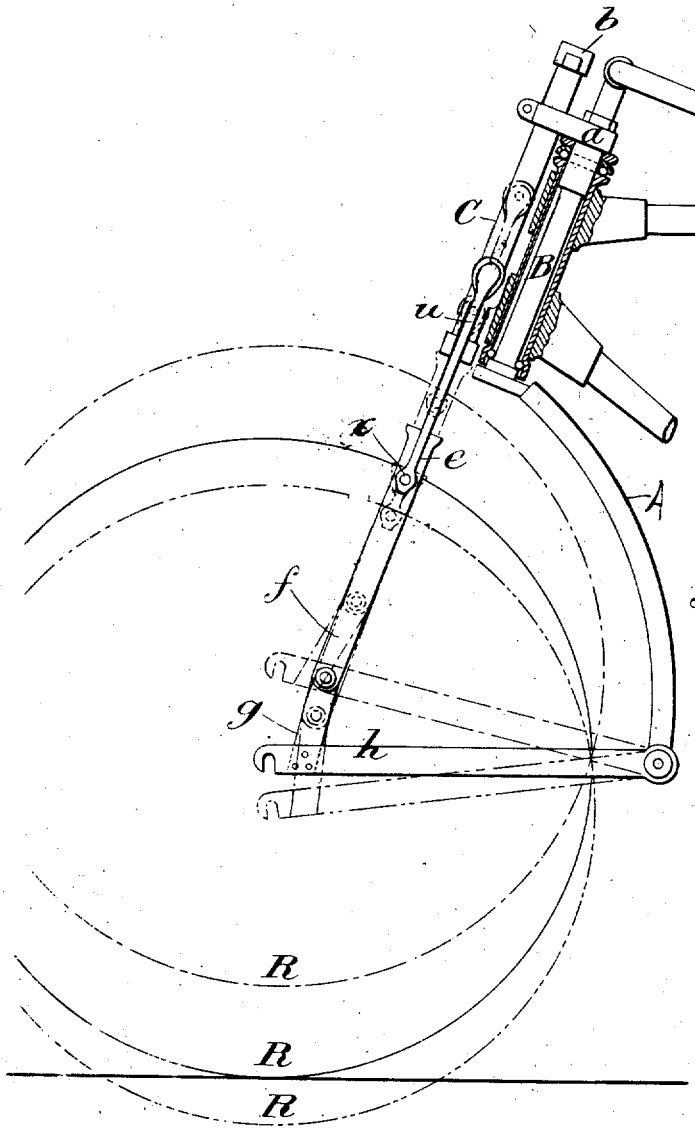
Figure 2:
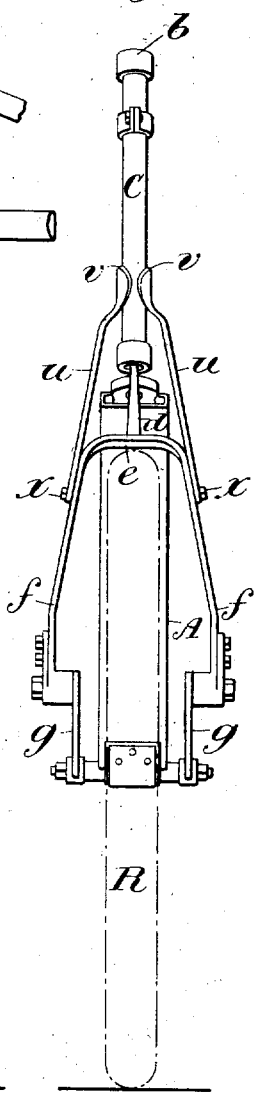
Figure 3:
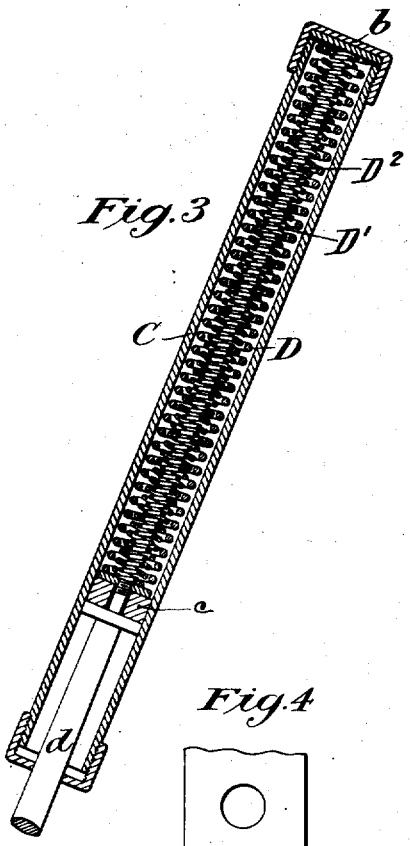
Figure 6:
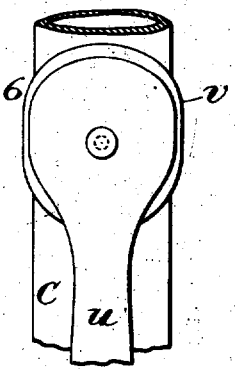
Figure 7:
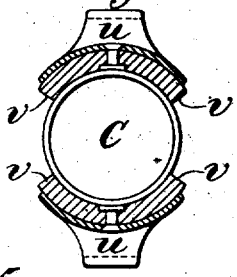
Figure 4:
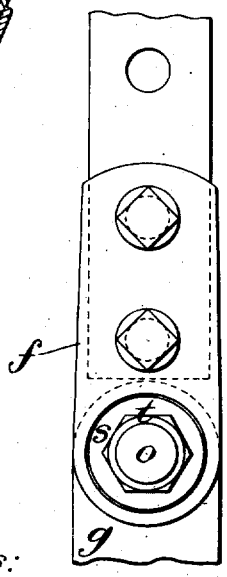
Figure 5:
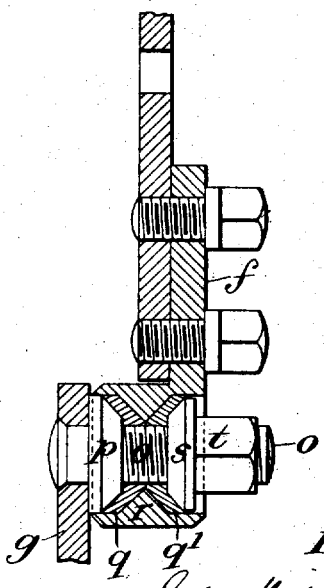

In said drawings, Figure 1 is a side elevation of the front portion of the tricycle, showing the mountings of the front wheel thereof; and Fig. 2 is a front elevation of the same parts. These views are on a small scale. Fig. 3 is a sectional view of the spring-casing and spring. Figs. 4 and 5 are respectively a side elevation and sectional view of the connection of the spring with the running-gear, to be hereinafter described. Figs. 6 and 7 are respectively a side elevation and transverse section of the frictional-joint couplings or connections.

B is the steering-stem, mounted to rotate axially in the tubular frame member, as usual, and A is a curved bar secured rigidly to the lower end of the stem B and extending downward back of the wheel R, which latter is indicated merely diagrammatically in Figs. 1 and 2. The bar A has jointed to it two arms *h*, which embrace the wheel R and extend forward to the hub thereof. The movements of the wheel up and down, as indicated by dotted lines in Fig. 1, cause the arms *h* to move or swing about their jointed connections with the lower end of the bar A.

Mounted in front of the stem B and secured thereto by a collar *q* is a spring-casing C in the form of a tube, and seen detached in Fig. 3. In this casing is a pinion *c* on a piston-rod *d* which extends down out of the lower end of the casing C and is coupled to a fork *e*, the branches *f f*, of which extend down at the sides of the wheel, Fig. 2, and are frictionally jointed, respectively, to lugs or branches *g* on and forming parts of the arms *h*. The piston *c* may be of any suitable form and construction, such as shown in Fig. 3, wherein said piston consists of two separated washers or plates mounted on piston rod *d* with an ordinary packing ring interposed between said plates or washers. In the casing C is a compression-spring, situated between the piston *c* and the cap *b* on the upper end of the casing. From the respective branches *f* of the fork *e* arms *u* secured to the branches at *x*, extend up to the casing C and carry at their upper ends pads *v*, which bear yieldingly on said casing.

The specific details of the construction will now be described with reference to Figs. 3 to 7, which show them on a scale larger than that of the principal views. As seen in Fig. 3, the spring is made up of coil-springs D, D′, D², one within the other and preferably coiled in opposite directions. Preferably, also, the outer spring will be of thicker wire than the one next inside of it, and this latter will be of thicker wire than that one within it, so that the power to resist compression will be about equal in all the springs. When the wheel R is driven upward by an obstruetion, the spring yields under the upward pressure of the piston *c*; but the friction of the latter in the casing will offer a yielding resistance and tend to retard the movement. The pads *v* on the arms *u* are of some soft material—as leather, for example—and these pads press yieldingly on the surface of the casing C with a gripping pressure, thus also aiding by friction to retard the upward movement of the wheel R with a yielding resistance and coöperating with the retarding-spring. The frictional devices at the joints where the arms *h* are coupled—at one end to the bar A and at the other end through the lugs *g* to the branches *f* of the fork—are illustrated in detail in Fig. 5. A bolt *o*, fixed at its head in the lug *g* and having a conical part *p*, is provided with a conical washer *s* and a nut *t*. The washer *s* may be splined on bolt *o* in any suitable and well known manner, which it is not necessary to illustrate. The eye *r*, through which the bolt *o* passes, is conically countersunk at its opposite ends and provided with leather washers *q q'*. When the bolt is in place and the nut *t* screwed up, the cones *p* and *s* bear frictionally on the washers and offer yielding resistance to the rotation of the bolt in the eye, thus coöperating with the other frictional devices.

Obviously the several devices for producing a frictional yielding resistance to the movements of the spring-supported parts of a vehicle may be applied in various ways, according to the particular construction and arrangement of the parts of the vehicle, and this invention is not limited to the exact construction shown.

It is furthermore obvious that the friction piston or plunger, as illustrated in Fig. 3, can be advantageously used either alone or in combination with the other types of spring retarding means shown and described in this application. If used alone it can be connected directly between the spring supported parts as shown, or any other means may be employed which will permit the parts to perform their predetermined functions.

I am aware, of course, that in spring-vehicles as now constructed there will often be found an immaterial amount of friction at the connecting-points between the parts which move relatively to each other; but this friction produces no useful result or effect whatever, whereas in my construction the yielding friction is very material, and while permitting the spring to compress and expand smoothly it exerts at all times a uniform retarding or slowing effect thereon when the spring expands, while it coöperates with the spring when the latter is under compression. Obviously the effect of my invention will be to materially modify the functions of the spring and cause it to act more slowly, but at the same time permit it to act smoothly and evenly. Obviously, also, the yielding friction must be regularized and uniform and not arbitrary and irregular in its action.

As shown in Fig. 7, the inner bearing surfaces of the pads *v* are curved so as to coöperate with the curved, outer bearing surfaces of the casing *c*, thus providing members movable longitudinally with respect to each other and having curved bearing surfaces.

Having thus described my invention what I claim and desire to secure by Letters Patent is:

1. A retarding device comprising, in combination, a friction cylinder, a piston frictionally mounted in said cylinder and sliding friction pads engaging the outer surfaces of said cylinder.

2. A retarding device, comprising in combination, a friction cylinder, a piston frictionally engaging said cylinder and rotating friction devices connected therewith.

3. A retarding device comprising a cylinder, a piston frictionally mounted in said cylinder, and friction pads engaging opposite sides of said cylinder and movable with said piston.

4. The combination with the parts of the vehicle which are movable relatively to each other, of a cylindrical member connected with one part of the vehicle and a friction member connected with the other part of the vehicle and having a curved bearing surface yieldingly and frictionally engaging said cylindrical member.

5. The combination with the parts of the vehicle which are movable relatively to each other, of a piston friction device and a rotary friction device.

In testimony whereof I have hereunto set my hand in the presence of two subscribing witnesses.

JULES MICHEL MARIE TRUFFAULT.

Witnesses:
FREDERIC W. CAULDWELL,
JOHN BAKER.